United States Patent Office 2,703,285
Patented Mar. 1, 1955

2,703,285

SYNTHETIC MILK PRODUCT

Herbert G. Luther, Baldwin, N. Y., assignor to Chas. Pfizer & Co., Inc., a corporation of Delaware No Drawing. Application April 21, 1951, Serial No. 222,290

5 Claims. (Cl. 99—2)

The present invention relates to a synthetic milk product. More particularly, it concerns a substantially dry composition that may easily be mixed with water to form a milk substitute.

A substantial percentage of deaths occurs among most young domesticated animals due to poor nutrition and other causes. The mortality rate is particularly high in the case of pigs, the national average being in the range of 35%. When large litters of pigs are born, the smaller pigs are at a disadvantage, being crowded out during feeding and, therefore, generally undernourished. Breast fed baby pigs are liable to various infections, such as scours, that seriously interfere with their nutrition. In some cases the sows die or cease to lactate early, thus leaving the young pigs without any good natural source of nutrition. Orphaned pigs may not be accepted by other nursing sows, when such are available. Over half of the deaths are due to the sows rolling over on the young pigs.

The main object of my invention is to provide a reliable, nutritious synthetic milk that may be substituted for the natural product or used to supplement it. A further object is to make such synthetic milk available in a highly concentrated form suitable for shipping and storing and easily diluted to proper strength for feeding. Another object is to assure the young animals of a well balanced diet including vitamins, growth promoting substances and substances that increase their resistance to the usual infections. Additional objects and advantages will become apparent from the following description of the invention.

I accomplish these objects and greatly alleviate the difficulties mentioned above by providing substantially anhydrous or low-moisture compositions that may be described as antibiotic-fortified, vitamin B12-containing, high fat content, readily regenerable, highly nutritious, synthetic milk products. I have found that the compositions of my invention are very useful in feeding young animals, especially pigs, and are highly acceptable to these animals. My compositions add nutrients and therapeutic agents to the diets of the young pigs, which ordinarily could not be obtained from the sow. Removal of many of the young pigs from the sows immediately decreases deaths due to "overlay" by the sows. In fact, in a number of experiments, it has been shown that the young pigs gain weight considerably more rapidly than is the case with sow-fed pigs. The rate of mortality is sharply reduced and the general health of the young pigs is markedly enhanced. The great advantage of these unexpected results is quite obvious. The various nutrient ingredients and the antibiotic included in these preparations seem to cofunction in a most advantageous manner which could not be anticipated from the known properties of these various materials. The compositions are particularly useful in feeding "runts," pigs which are definitely below average in weight and general health when born. The compositions of this invention are so advantageous with runts that these animals, when weaned, generally have a higher weight and much better health than do normal pigs which have been sow-fed.

A further advantage of these compositions is that the sow in many cases need not be treated to cause lactation to cease, but may be shipped directly to market and sold at a high price. This is in contrast to the lower price usually obtained after the sow has weaned a litter. It is possible to substitute my synthetic milk directly after birth, whereas compositions now marketed may not be used until the fourth week and then only to supplement the natural milk flow. In some cases it has been contended that commercially available materials could be used at an earlier age but they have proven of little value.

The compositions of this invention contain fat in a proportion of about 10 to 40% by weight on a dry basis. This material may be corn oil, lard, cottonseed oil, soybean oil, sesame oil, palm oil, or other suitably nutritious fat-type materials. These materials may be modified by hydrogenating to a certain extent to alter their physical properties. Such a high proportion of fat furnishes a high energy content which is particularly suitable for the growth of young pigs, but may also be applied to the growth of other young animals, such as calves, colts, and the like. The use of lard may prove particularly economical since it is best adapted to be used by the pig. Its use provides a ready market for the lard and, in effect, the lard is "recycled" to the pig for further use. The second component of my new compositions is a source of casein, or other high quality protein, in particular, dried skim milk. This material is used to the extent of about 65 to 70% by weight on a dry basis. It may be substituted in part by dry or semi-solid whey or other suitable sources of protein. If desired, the casein source may be decreased or omitted and the composition which will then be a paste or heavy, oily fluid, may be diluted with skim milk at the farm. Since large quantities of skim milk are often available at a farm or nearby this may, in many cases, be the most economical manner of operation. When the dry casein source is omitted, it is advisable to use a solid fat (e. g. lard) to obtain a pasty, rather than oily, product for ease of handling.

A further component of my compositions is an emulsifier, most suitably lecithin. This material serves to assist in the dispersion of the dry product, when it is mixed with water. It may be present in the compositions in a proportion of from about ½ to about 8% by weight on a dry basis and, preferably, at a level of about 2 to 5% by weight. Lecithin is not only an excellent emulsifier for these compositions, but it also possesses nutritive value of itself. Fish solubles, a by-product of the fish industry, is desirably included in the new compositions to the extent of from about 1 to about 10% by weight on a dry basis, and, preferably, at the level of about 3 to 7% by weight. This material provides high quality protein containing a good distribution of amino acids, as well as certain other nutritive factors including vitamin B12 and other, as yet unidentified, materials. The fish solubles may be included in the form of a 50% solids paste or as a dry powder. The latter is to be preferred from the standpoint of stability, as well as favorable physical properties of the compositions. However, if sufficiently high levels of the vitamins and protein from other sources are used fish solubles may be omitted.

The new compositions of this invention are further provided with a high level of a variety of known vitamin factors including vitamin A, vitamin D2, ascorbic acid, thiamin hydrochloride, riboflavin, niacin, pyridoxine hydrochloride, calcium pantothenate, inositol, choline, and complete trace minerals (e. g. iron, copper, zinc, cobalt, manganese, etc.). The levels at which the new compositions of this invention are fortified with these vitamins and trace minerals will be illustrated in the following examples. Besides the above listed vitamins, the new compositions also include an additional source of vitamin B12. This vitamin may be supplied in the form of pure crystalline material, but it is preferred to use commercially-available concentrates obtained from fermentation sources, such as a crude dried fermentation product currently marketed by Chas. Pfizer & Co., Inc. under the trade-mark Bi-Con 3+, which contains about 3 milligrams of the vitamin per pound. A concentrate of this nature is added in the proportion of about ½ to 2% by weight in the dry synthetic milk.

It has been found that, if an antibiotic, particularly a broad spectrum antibiotic such as oxytetracycline (also known by the registered trade-mark "Terramycin") or chlortetracycline (trade-mark "Aureomycin") is added to the various ingredients listed above in preparing the new compositions, the animals that are fed with this diet display an unusually high level of health and a very rapid rate of growth. The degree of this multiple effect, produced by the antibiotic in conjunction with the various other ingredients of my compositions, is quite unexpected. Oxytetracycline may be added to the compositions in the form of a pure crystalline material, either amphoteric oxytetracycline or one of its salts, but it has been found that the commercially available, dried antibiotic fermentation feed supplement containing oxytetracycline to the extent of 5 grams per pound and known as Bi-Con TM5 is very suitable for this purpose. Although certain broad spectrum antibiotics, and in particular oxytetracycline, are preferred, other antibiotics, such as penicillin (in the form of one of its stable, slightly water-soluble salts, i. e. the procaine salt, the dibenzylethylene diamine salt, etc.). may replace oxytetracycline or be used in addition to oxytetracycline. Certain antibiotics, such as bacitracin, have been found unsatisfactory in the pig, possibly because of instability in the animal's system.

It has been found that these antibiotics are quite compatible with the compositions that have been described. When a group of young pigs is infected with a specific disease, it may be found advisable to raise the level of the antibiotic utilized and adjust the antibiotic composition depending upon the particular disease. The synthetic milk prepared from my anhydrous compositions is an excellent carrier for single or multiple antibiotics. It offers an unusually convenient means of administering antibiotics to the young animals by the oral route. The amount of antibiotic may be maintained at such a level that it is prophylactic, that is, it serves to prevent some of the diseases that often contribute to poor health or deaths among young pigs. If a specific infection is encountered in a group of pigs, the antibiotic level may be raised to therapeutic levels. In either case, the products of this invention are admirably suited as carriers or means of introduction of antibiotics for young animals and particularly pigs. In general, it is preferred to use in the order of at least about 20 parts per million of the milk product (on a dry basis). In certain disease conditions of the animals, it may be advisable to raise this considerably (e. g., to as high as 500 or more parts per million based on dry food).

For preparing the compositions of this invention I have found that a variety of commercially available equipment is quite suitable. The dried skim milk may be agitated in a ribbon blender or other suitable apparatus, such as dough mixer, and the fat or oil may be gradually added until the composition is uniform throughout. This generally yields a powdery to pasty product. The consistency of the product will depend to a certain extent upon the proportion and melting point of the fatty materials included in the composition and also the proportion of water present in the fish solubles used. The various other ingredients may then be added to the mixture. Thorough agitation must be maintained throughout the addition, in order that the nutritive materials may be uniformly distributed throughout the compositions. Mixing should be thorough enough, so that some emulsification of the components is obtained at this stage. When all or part of the dried skim milk is to be omitted the other materials are carefully mixed and a paste-like or oily composition, depending upon the type of oil or fat used, is obtained.

It has been found that a particular order of addition of the materials is very useful. The oil or fatty material is first placed in the mixer with the lecithin or other emulsifier. The temperature of this material may be elevated to make it more easily agitated. The skim milk solids (when it is to be used) are added, until a suitable paste that is easily stirred is obtained; then the various aqueous materials, such as 50% fish solubles, are added. After stirring well to obtain a semi-fluid, at least partially emulsified mixture, the rest of the dry solids are gradually added to obtain a substantially dry product which may be packaged in suitable containers. This material is particularly easy to disperse, when mixed with water. The dry product may be packed in drums or barrels of suitable construction and preferably so made that absorption of moisture is minimized. My dry compositions lose little of their nutritive value when stored at ordinary temperatures for periods of several months or more.

In order to form the synthetic milk of this invention, it has been found quite easy to stir the dry powder into warm water by hand, when the preferred procedure described just above is used in the preparation of the powder. A mixer of the Waring Blendor type is especially useful for producing small volumes of the milk. When this is to be done on a large scale, it is preferable to use a mechanical mixer. After the synthetic milk has been stirred for a short time, approximately ½ to 15 minutes, it is ready for use. It has been found that the stability of the synthetic milk is especially high. It may be stored for periods of up to a day or two at moderate temperatures without appreciable loss in the nutritive value and with little or no separation into layers. This is surprising in the light of the high proportion of fat that is present in the milk. For forming the synthetic milk it has been found most suitable to use about 5 parts by weight of warm water to about one part by weight of the dry composition.

It is not intended that pigs be raised to market weight by means of the new, highly nutritive, synthetic milks. They are primarily intended for feeding young pigs for the minimum time necessary to raise them to such a stage that they can consume solid or semi-solid foods of the usual type. It has been found that the new compositions are very useful in raising pigs from birth, or shortly thereafter, to a stage where "creep feeding" is possible. This is accomplished with unusual rapidity. When this stage is reached, the pigs may be feed on a semi-solid feed, part of which is the synthetic milk compositions of this invention. In a short time the pigs may then be transferred to solid food.

The following examples are given by way of illustration and are not to be considered as limiting this invention, except insofar as such limitation is required by the express wording of the appended claims.

*Example I*

A synthetic milk comosition was prepared from the following materials:

| | | |
|---|---|---|
| Skim milk (dry) | pounds | 66.6 |
| Corn oil | do | 25.0 |
| Lecithin | do | 4.0 |
| Fish solubles (50%) | do | 12.5 |
| Vitamin A | units | 700,000 |
| Vitamin D2 | do | 70,000 |
| Ascorbic acid | grams | 7 |
| Thiamin hydrochloride | do | 0.217 |
| Riboflavin | do | 0.465 |
| Niacin | do | 0.94 |
| Pyridoxine hydrochloride | do | 0.465 |
| Calcium pantothenate | do | 2.76 |
| Inositol | do | 9.6 |
| Choline | do | 96 |
| Vitamin B12 (Bi-Con 3+) | pound | 1 |
| Oxytetracycline (Bi-Con TM5) | grams | 240 |
| Trace minerals (Co, Fe, Zn, Sn, etc.) | Traces in combined forms | |

This composition was blended together by the preferred method described above. After the material was completely uniform throughout, it was packed in fibre drums with a suitable fat-proof and water-proof liner. It was found that the material was very readily converted into a stable milk preparation by gradually adding one part by weight of the composition to about five parts by weight of warm water. Mechanical agitation yielded a uniform suspension which did not settle out for more than a day. When a sample of the composition was mixed with five parts by weight of warm water for one minute in a Waring Blendor, the average fat particle size was approximately 3 microns. This indicates the extremely fine dispersion that may be obtained with these compositions. This, of course, imparts considerable stability to the suspension in water allowing for storage for a number of hours without appreciable separation of the oil or fat.

*Example II*

A group of 10 new born pigs were removed from the sow about 48 hours after birth. They were fed a synthetic sow's milk prepared as described in the preceding example. The pigs gained weight very rapidly, and after 13 days they averaged 1.5 pounds heavier, when compared to the sow-fed pigs from the same litters. It was found that the feed efficiency was 0.94, that is, for each pound of the synthetic milk (dry basis) fed there was an average gain of 0.94 pound in the weight of the young pigs. This is extremely efficient feeding.

*Example III*

A group of "runts" which were in such poor condition that practical herdsmen believed most of them would die, were taken from the sow soon after birth. These were trough-fed with the synthetic milk composition described in Example I. One of the pigs died within a day after the test started from an unknown cause. At the end of two weeks, the remaining pigs in this group had a greater average weight than normal pigs of the same type raised by a sow. In this case the feed efficiency was 1.0.

*Example IV*

Twenty-one pigs were removed from the sows within two days after birth. These were normal in all respects. They were raised on the synthetic milk described in Example I. At the end of two weeks there had been one death (from an unknown cause), and the other animals were in excellent condition. In this group the feed efficiency was 1.06 and the average weight of the animals was definitely higher than those raised by the sow.

A group of 20 pigs taken from the same litters as the above group was raised in the usual manner by means of the sows. At the end of two weeks five animals had died and, as noted above, the average weight was lower than those fed on the synthetic milk.

A group of 9 pigs (average weight 2 pounds 13 ounces) chosen from the same litters as the two groups above was fed according to directions on a commercially-available synthetic milk claimed to be useful for feeding young pigs. At the end of one week, 5 of the pigs were dead. The remaining 4 were kept on the diet. Their average weight was 4 pounds 10 ounces. At the end of two weeks of feeding on this commercially-available milk product, the average weight of the 4 pigs was 6 pounds 14 ounces, definitely lower than that of the pigs from the same litters that had been fed on the new composition of this invention. At this point the pigs were in very bad condition, being close to death. They were changed from the commercially-available milk product to the product described in Example I above. They immediately began to gain weight and, at the end of six weeks, they averaged 22 pounds 12 ounces in weight. This is definitely above the average weight for this type of pig (Durocs) at this age.

*Example V*

A synthetic milk composition was prepared from the following materials:

| | | |
|---|---|---|
| Skim milk | pounds | 66.6 |
| Lard | do | 25.0 |
| Lecithin | do | 4.0 |
| Fish solubles (50%) | do | 12.5 |
| Vitamin A | units | 700,000 |
| Vitamin D2 | do | 70,000 |
| Ascorbic acid | grams | 7 |
| Thiamin hydrochloride | do | 0.217 |
| Riboflavin | do | 0.465 |
| Niacin | do | 0.94 |
| Pyridoxine hydrochloride | do | 0.465 |
| Calcium pantothenate | do | 2.76 |
| Inositol | do | 9.6 |
| Choline | do | 96 |
| Vitamin B12 (Bi-Con 3+) | pound | 1 |
| Oxytetracycline (Bi-Con TM5) | grams | 240 |
| Trace minerals (Co, Fe, Zn, Sn, etc.) | | Traces in combined forms |

This composition was blended and packed as described in Example I. The product proved excellently suited for feeding pigs from birth.

*Example VI*

A composition was prepared from the following materials:

| | | |
|---|---|---|
| Lard | pounds | 25.0 |
| Lecithin | do | 4.0 |
| Vitamin A | units | 700,000 |
| Vitamin D2 | do | 70,000 |
| Ascorbic acid | grams | 7 |
| Thiamin hydrochloride | do | 0.217 |
| Riboflavin | do | 0.465 |
| Niacin | do | 0.94 |
| Pyridoxine hydrochloride | do | 0.465 |
| Calcium pantothenate | do | 2.76 |
| Inositol | do | 9.6 |
| Choline | do | 96 |
| Vitamin B12 (Bi-Con 3+) | pound | 1 |
| Oxytetracycline (Bi-Con TM5) | grams | 240 |
| Trace minerals (Co, Fe, Zn, Sn, etc.) | | Traces in combined forms |

This material had the consistency of mayonnaise when it was blended. It was diluted at the farm with liquid skim milk using about 5 to 6 pounds of the composition per 100 pounds of skim milk. By stirring for a very short time a liquid composition, highly suitable for feeding young pigs, was obtained.

*Example VII*

A synthetic milk composition was prepared from the following materials:

| | | |
|---|---|---|
| Skim milk (dry) | pounds | 75.0 |
| Corn oil | do | 25.0 |
| Lecithin | do | 4.0 |
| Vitamin A | units | 550,000 |
| Vitamin D2 | do | 70,000 |
| Ascorbic acid | grams | 3.0 |
| Thiamin hydrochloride | do | 0.14 |
| Riboflavin | do | 0.18 |
| Niacin | do | 0.94 |
| Pyridoxine hydrochloride | do | 0.16 |
| Calcium pantothenate | do | 2.0 |
| Inositol | do | 3.8 |
| Choline | do | 55 |
| Vitamin B12 (Bi-Con 3+) | pound | 1 |
| Oxytetracycline (Bi-Con TM5) | grams | 240 |
| Trace minerals (Co, Fe, Zn, Sn, etc.) | | Traces in combined forms |

This material, which has a somewhat lower proportion of vitamins than in the previous examples, was found to be suitable for use with young pigs.

*Example VIII*

A synthetic milk composition was prepared from the following materials:

| | | |
|---|---|---|
| Skim milk (dry) | pounds | 24 |
| Lard | do | 25 |
| Lecithin | do | 5.0 |
| 65% Whey solids | do | 75 |
| Vitamin A | units | 700,000 |
| Vitamin D2 | do | 70,000 |
| Ascorbic acid | grams | 7 |
| Thiamin hydrochloride | do | 0.217 |
| Riboflavin | do | 0.465 |
| Niacin | do | 0.94 |
| Pyridoxine hydrochloride | do | 0.465 |
| Calcium pantothenate | do | 2.76 |
| Inositol | do | 9.6 |
| Choline | do | 96 |
| Vitamin B12 (Bi-Con 3+) | pound | 1 |
| Oxytetracycline (Bi-Con TM5) | grams | 240 |
| Trace minerals (Co, Fe Zn, Sn, etc.) | | Traces in combined forms |

Young pigs fed from birth on this diet were found to thrive. The gain in weight and condition of the animals were excellent.

I claim:

1. A suckling pig food mix dispersible in skim milk to form a dispersion suitable as a feed for pigs beginning about forty-eight hours after birth, said mix including at least about 10% edible fat by weight, edible emulsifier in a concentration sufficient to cause the fat to emulsify when dispersed, a balanced vitamin content dietetically essential to porcine health, said content including vitamin B12 in an amount of about 1.5 to 6 milligrams per hundred pounds, a balanced content of trace food minerals dietetically essential to porcine health, and an antibiotic of the class consisting of oxytetracycline and chlortetracycline in a proportion of at least about 20 parts per million.

2. A suckling pig food mix dispersible in aqueous media to form a dispersion suitable as a feed for pigs beginning about forty-eight hours after birth, said mix including about 10 to 40% edible fat by weight, edible protein including casein, edible emulsifier in a concentration sufficient to cause the mix to emulsify when dispersed, a balanced vitamin content dietetically essential to porcine health, said content including vitamin B12 in an amount of about 1.5 to 6 milligrams per hundred pounds, a balanced content of trace food minerals dietetically essential to porcine health, and an antibiotic of the class consisting of oxytetracycline and chlortetracycline in a proportion of at least about 20 parts per million.

3. The invention of claim 1 in which the emulsifier is lecithin and the vitamins include vitamin A, vitamin $D_2$, ascorbic acid, thiamin hydrochloride, riboflavin, niacin, pyridoxine hydrochloride, calcium pantothenate, inositol and choline.

4. The invention of claim 2 in which the protein is skim milk solids in an amount of from 60 to 75%, the vitamins include vitamin A, vitamin $D_2$, ascorbic acid, thiamin hydrochloride, riboflavin, niacin, pyridoxine hydrochloride, calcium pantothenate, inositol and choline, and the trace minerals include iron, copper, zinc, cobalt and manganese.

5. A suckling pig food mix dispersible in aqueous media to form a dispersion suitable as a feed for pigs beginning about forty-eight hours after birth, said mix including about 10 to 40% edible fat by weight, skim milk solids in an amount of from 60 to 75%, lecithin in an amount of from ½ to 8% by weight, vitamins in the following proportions per 25 pounds of fat

| | | |
|---|---|---|
| Vitamin A | units | 550,000 to 700,000 |
| Vitamin $D_2$ | do | 70,000 |
| Ascorbic acid | grams | 3.0 to 7 |
| Thiamin hydrochloride | do | 0.14 to 0.217 |
| Riboflavin | do | 0.18 to 0.465 |
| Niacin | do | 0.94 |
| Pyridoxine hydrochloride | do | 0.16 to 0.465 |
| Calcium pantothenate | do | 2.0 to 2.76 |
| Inositol | do | 3.8 to 9.6 |
| Choline | do | 55 to 96 | vitamin $B_{12}$ in an amount of about 1.5 to 6 milligrams per hundred pounds of mix, a balanced content of trace food minerals dietetically essential to porcine health, including iron, copper, zinc, cobalt and manganese, and at least 20 parts of oxytetracycline per million parts of mix.

References Cited in the file of this patent

UNITED STATES PATENTS

| | | |
|---|---|---|
| 2,472,663 | Kleine et al. | June 7, 1949 |
| 2,489,759 | Dunn et al. | Nov. 29, 1949 |
| 2,525,294 | Gunther et al. | Oct. 10, 1950 |
| 2,556,111 | Sargent | June 5, 1951 |

OTHER REFERENCES

Arch. Biochem. 25, 2, February 1950, pages 455–457.
Science News Letter for December 1950, page 376.